United States Patent [19]

Sakakibara

[11] Patent Number: 5,186,145
[45] Date of Patent: Feb. 16, 1993

[54] KNOCKING CONTROL APPARATUS FOR INTERNAL COMBUSTION ENGINE

[75] Inventor: Koji Sakakibara, Hekinan, Japan
[73] Assignee: Nippondenso Co., Ltd., Kariya, Japan
[21] Appl. No.: 810,415
[22] Filed: Dec. 20, 1991

[30] Foreign Application Priority Data

Dec. 20, 1990 [JP] Japan .................................. 2-404032

[51] Int. Cl.⁵ ............................................. F02P 5/14
[52] U.S. Cl. ................................................... 123/425
[58] Field of Search ................... 123/425; 364/431.08

[56] References Cited

U.S. PATENT DOCUMENTS

| | | | |
|---|---|---|---|
| 4,993,387 | 2/1991 | Sakakibara et al. | 123/425 |
| 5,054,448 | 10/1991 | Matsuoka et al. | 123/425 |
| 5,065,724 | 11/1991 | Takeda | 123/425 |
| 5,088,044 | 2/1992 | Matsura | 364/431.08 |
| 5,090,382 | 2/1992 | Bolander et al. | 123/425 |
| 5,090,383 | 2/1992 | Demizu et al. | 123/425 |
| 5,101,790 | 4/1992 | Takasu et al. | 123/425 |

FOREIGN PATENT DOCUMENTS

| | | | |
|---|---|---|---|
| 58-59374 | 4/1983 | Japan | 123/425 |
| 59-46519 | 3/1984 | Japan | 123/425 |
| 1315647 | 12/1989 | Japan | 123/425 |

*Primary Examiner*—Raymond A. Nelli
*Attorney, Agent, or Firm*—Cushman, Darby & Cushman

[57] ABSTRACT

A control apparatus for an internal combustion engine having: a sensor for detecting a running condition of the internal combustion engine; a detector for detecting information indicative of the running condition in accordance with an output signal of the sensor; and a controller for controlling the internal combustion engine in accordance with a detection result of the detector, the controller communicating with the detector through a signal line is characterized in that: the detector includes sending circuit for sending the information by change in level of the signal lines from the last outputted information and the controller comprises: a reading circuit for reading level of the signal line; a memory for storing the read level of the signal line; a restoring circuit for restoring the information in accordance with the change of level read at this time from the level stored at the last time; a setting circuit for setting an amount of controlling of the internal combustion engine in accordance with restored result; and sub-controller for effecting a safety control when the level of the signal line read at this time does not change from that read out at the last time.

10 Claims, 8 Drawing Sheets

FIG. 9

KNOCKING CONTROL APPARATUS FOR INTERNAL COMBUSTION ENGINE

BACKGROUND OF THE INVENTION

1. Field of the Invention

This invention relates to a knocking control apparatus of an internal combustion engine for controlling ignition timing in accordance with the presence of knocking.

2. Description of the Prior Art

A knocking controlling system having a microprocessor (MPU) for detecting knocking in addition to a microprocessor for controlling of knocking is known. In such prior art knocking system, the detection result of knocking is sent from the knocking detection microprocessor to the knock control microprocessor. Such technique is disclosed in Japanese patent application provisional publication No. 59-46519 (U.S. Pat. No. 4,498,331), No. 1-315647 (U.S. Pat. No. 4,993,387) and Japanese patent publication No. 63-42112.

However, in such systems, when a communication port is failed and the knocking detection microprocessor detects the presence of knocking, the knocking control microprocessor may judge that there is no knocking.

The reason is as follows:

If knocking detection result is represented by combination of levels of output ports Q2 and Q3 in the communication signal lines between the knock detection microprocessor and the knocking control microprocessor, the knocking detection result is, for example, as follows:

TABLE 1

| knocking detection result | no knocking | low degree of knocking | medium degree of knocking | large degree of knocking |
|---|---|---|---|---|
| port Q2 | 0 | 1 | 0 | 1 |
| port Q3 | 0 | 0 | 1 | 1 |

Therefore, there is a problem that the internal combustion engine is damage because the phase lag control is not carried out though knocking occurs when the ports Q2 and Q3 for outputting the knocking detection result or the signal lines for commemoration between two microprocessors are failed, so that the ports Q2 and Q3 are fixed to zero level.

SUMMARY OF THE INVENTION

The present invention has been developed in order to remove the above-described drawbacks inherent to the conventional knocking control apparatus.

The aim of this invention is to provide a knocking control apparatus preventing the internal combustion engine from damage by executing a fail safe processing when the output ports or the signal lines fail.

According to the present invention there is provided a control apparatus for an internal combustion engine having: a sensor for detecting a running condition of the internal combustion engine; a detector for detecting information indicative of the running condition in accordance with an output signal of the sensor; and a controller for controlling the internal combustion engine in accordance with a detection result of the detector, the controller communicating with the detector through a signal line is characterized in that; the detector includes sending circuit for sending the information by change in level of the signal lines from the information outputted at the last time and the controller comprises: a reading circuit for reading level of the signal line sent by the sending circuit; a memory for storing the read level of the signal line; restoring circuit for restoring the information in accordance with the change of level of the signal line read at this time from the level of the signal line stored at the last time; a setting circuit for setting an amount of controlling of the internal combustion engine in accordance with restored result; and a sub-controller for effecting a safety control when the level of the signal line read at this time does not change from that read out at the last time.

This detects knocking developed in the internal combustion engine by a knocking sensor. Then, the magnitude detection means detects magnitude of knocking from the detection result. Then, the sending means sends the magnitude of knocking in accordance with change in the signal line level from the former signal line level. The reading means reads the signal line level sent.

Then, the storing means stores the read signal line level. The restoring means restores the magnitude of knocking in accordance with changing degree of the signal line level read at this time from the former signal level stored in the storing means.

The ignition timing is controlled in accordance with this restored result so that knocking is reduced.

When the above-mentioned sending means or the signal line is failed, the signal line levels will not change from the former signal line levels. In such case, the phase lag of the ignition timing is so controlled as to reduce knocking.

This invention provides a given phase lag control when output levels of the signal line are unchanged because the signal line for sending the knocking detection result or the output ports of knocking detection result is failed.

Thus, though knocking occurs when the communication between the knocking detection microprocessor and the knocking control microprocessor cannot be obtained, the internal combustion engine can be prevented from damage by a sure phase lag control is performed.

According to the present invention there is also provided a control apparatus for an internal combustion engine having: a knocking sensor for detecting knocking developed in the internal combustion engine; knocking detector for detecting knocking in accordance with an output of the knocking sensor; knocking controller for controlling the internal combustion engine in accordance with the knocking detection result of the knocking detector, the knocking controller communicating with the knocking detector through a signal line, characterized in that: the knocking detector comprises magnitude detector for detection a magnitude of knocking from an output signal of the knocking sensor; and a sending circuit for sending the magnitude of knocking from the magnitude detector, the magnitude being indicated by change in level of the signal line from that sent at the last time and the knocking controller comprises: a reading circuit for reading the level of the signal line sent from the sending means; a memory for storing the read level of the signal line; a restoring circuit for restoring the magnitude of the knocking in accordance with change in the level of the signal line read at this time from the level read at last time; a controller for controlling an ignition timing in accordance with a result of the restoring means; and a sub-controller for effecting a phase lag control of the ignition timing when the level of signal line read at this time does not change from the level of the signal line read at the last time.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment with reference to drawings.

Figure 1:
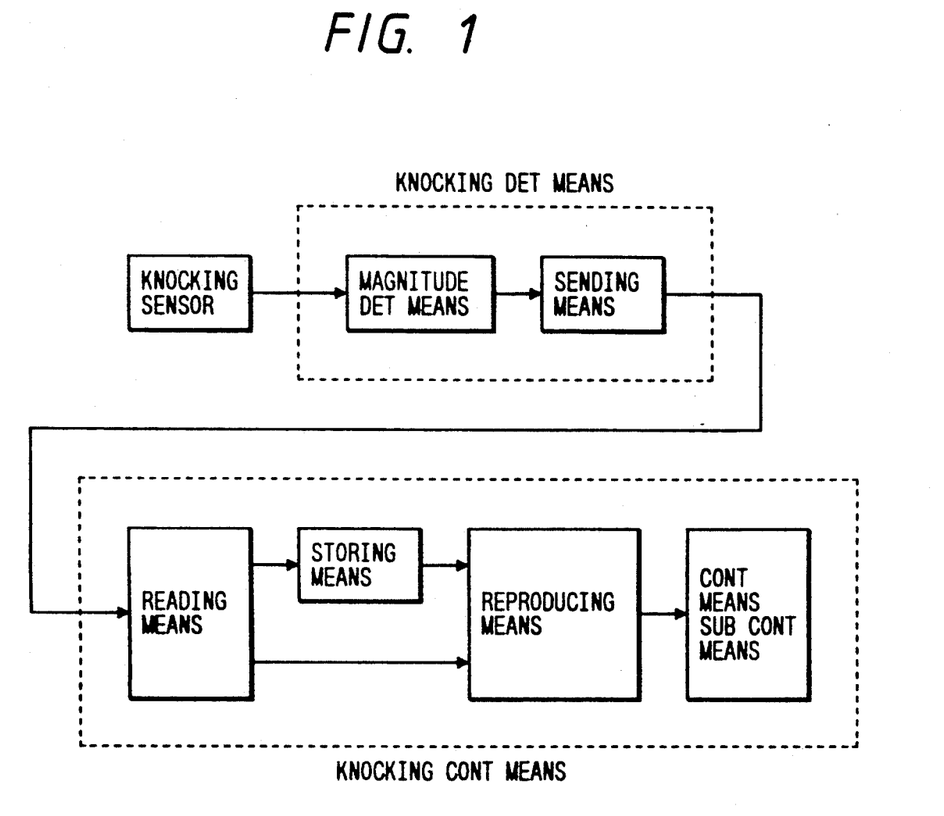
FIG. 1 is a functional block diagram of an embodiment of the invention of the knocking control apparatus.
Figure 2:
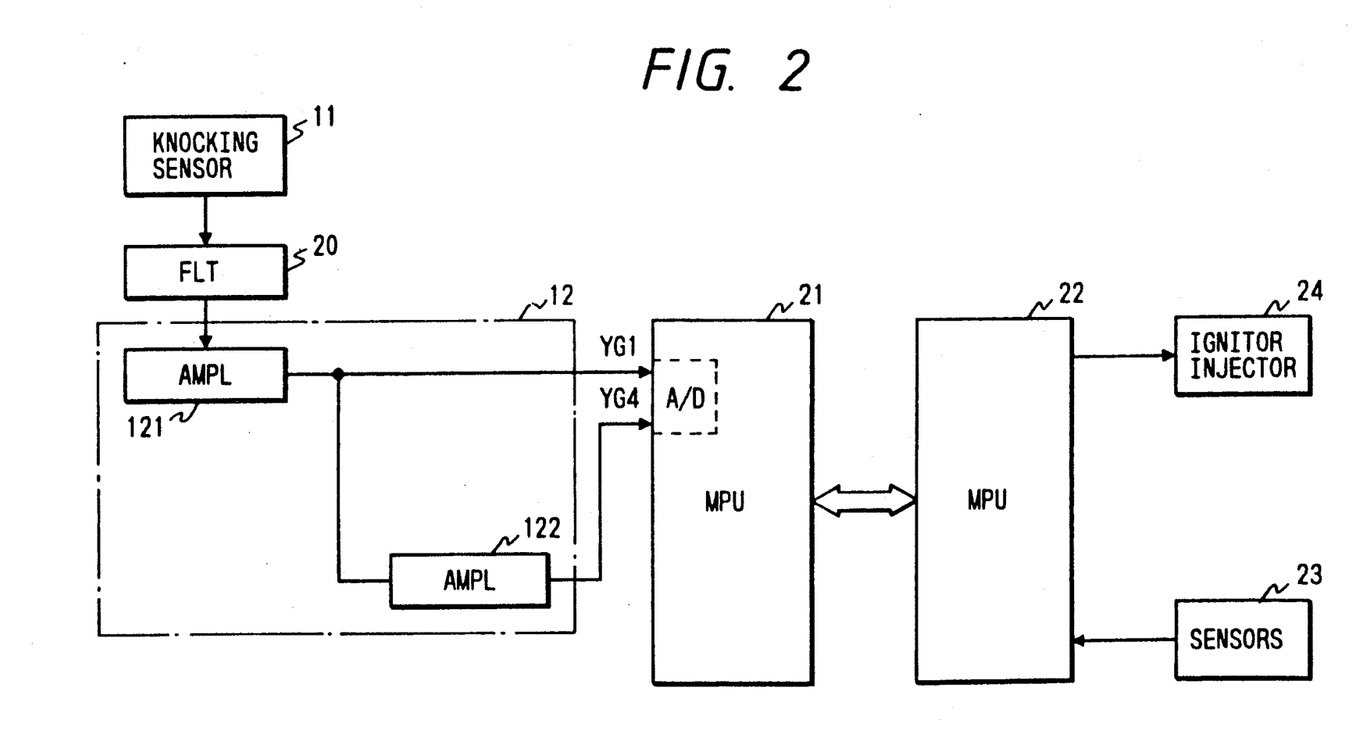
FIG. 2 is a block diagram of a knocking control apparatus of the embodiment.

FIG. 1 is a functional block diagram of this embodiment of the invention of the knocking control apparatus. FIG. 2 is a block diagram of a knocking control apparatus of this embodiment. A knocking sensor 11 detects mechanical vibrations developed in accordance with knocking when knocking occurs in an internal combustion engine (not shown).

A detection signal from the knocking sensor 11 is supplied to a filter circuit 20. The filter 20 removes noise components from the detection signal from the knocking sensor 11, that is, it extracts a frequency component signal corresponding vibrations accompanied with development of knocking in the internal combustion engine. The signal corresponding knocking component from the filter circuit 20 is supplied to an amplifying circuit 12.

This amplifying circuit 12 comprises a first amplifier 121 and a second amplifier 122. A first knocking signal is obtained by amplification by only the first amplifier 121. A second knocking signal is obtained by amplification by both of first and second amplifiers 121 and 122.

In this case, a circuit for the above-mentioned second knocking signal is set to have a gain four times that of the first amplifier 121. The first and second knocking signals obtained by the amplifying circuit 12 are supplied to an A/D converting input ports YG1 and YG2 of a microprocessor (MPU) 21 for knocking detection respectively.

The microprocessor 21 detects knocking by reading knocking signals from input ports YG1 and YG2 through A/D conversion and executing a knocking judging operation in accordance with the first and second knocking signals.

An microprocessor 22 for controlling the internal combustion engine operates ignition timing and the fuel injection amount on the basis of the knocking judging signal from the above-mentioned microprocessor 21 and detection signals from various sensors 23 such as a crank angle sensor, a pressure sensor, and an water temperature sensor. Then, it controls controlling objects 24 such as an ignitor and injector 24.

Figure 3:
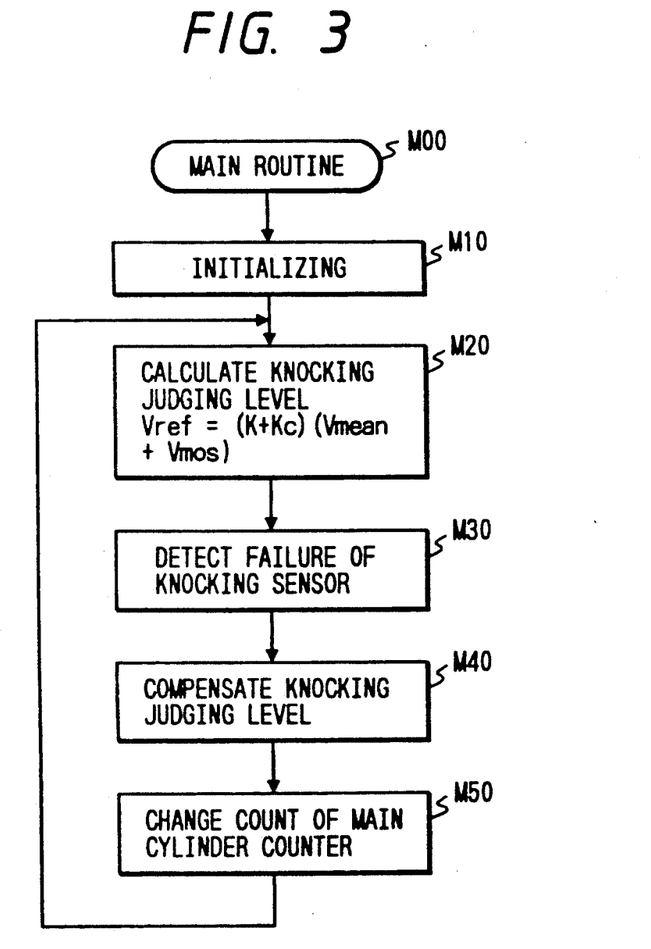
FIG. 3 shows a flow chart of a main routine of operation for knocking detection.

FIG. 3 shows a main routine of operation executed by the above-mentioned microprocessor 21 for knocking detection. This main routine starts from a step M00. At first, in a step M10, initializing operation is executed, that is, a RAM (not shown), I/O ports, etc. of the microprocessor 21 are initialized.

After the initialization is executed as mentioned, in the following step M20, operation of a knocking judging level Vref is executed. This judging level Vref is calculated on the basis of the following equation:

$$Vref = (K \times KC) \times (Vmean + Vmos)$$

where K is a constant determined in accordance with running condition of the engine, KC is a variable for compensating the knocking judging level, Vmean is an average value of knocking magnitude value V, and Vmos is a constant for absorbing A/D converting error.

In the following step M30, a failure of the knocking sensor 11 is detected. In the following step M40, processing of compensation of the knocking judging level is executed. In the following step M50, a count of a counter for the main cylinder is changed.

Figure 4:
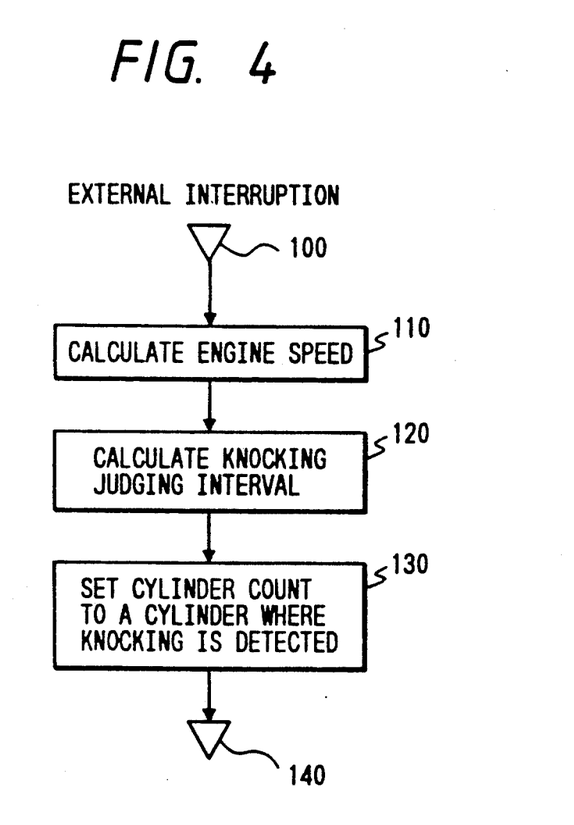
FIG. 4 shows a flow chart of an external interrupt routine accompanied with the main routine.

FIG. 4 shows an external interrupt routine. For example, a timing of this interruption is set to 10° CA BTDC (before top dead center) of the engine. When this interrupt routine starts, in step 110, the engine speed is calculated from a time period from the last interruption to the present interruption. Then, in step 120, a suitable knocking judging interval, for example, 10° CA-90° ATDC (after top dead center) of the engine, is calculated in accordance with the engine speed information calculated as mentioned above.

When the knocking judging interval is calculated as mentioned above, a timer is set to execute a timer interruption at a timing corresponding to the start timing of the knocking judging interval. In the following step 130, the cylinder count of the counter is set to a cylinder where knocking is to be judged. In step 140, processing returns to the main routine.

Figure 5:
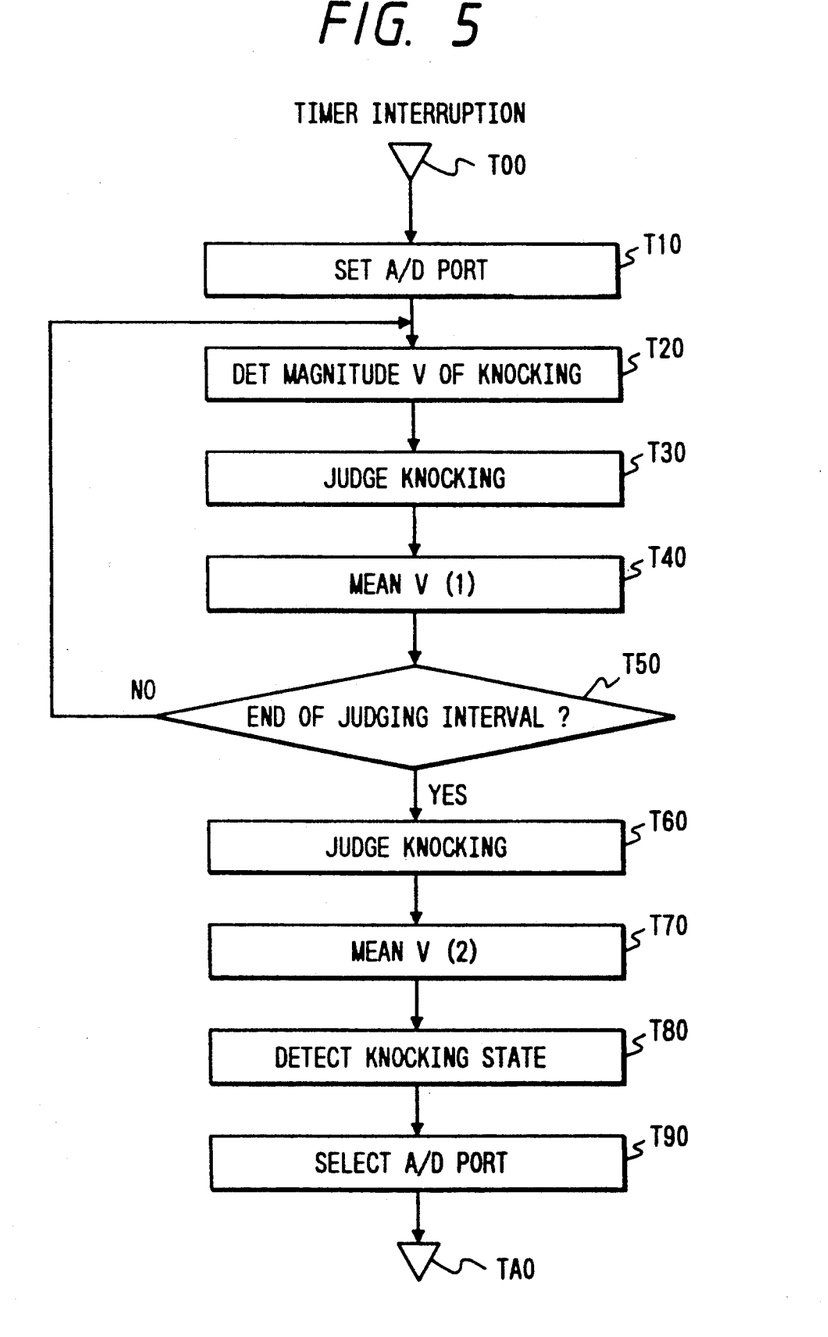
FIG. 5 shows a timer interrupt routine accompanied with the main routine.
Figure 6:
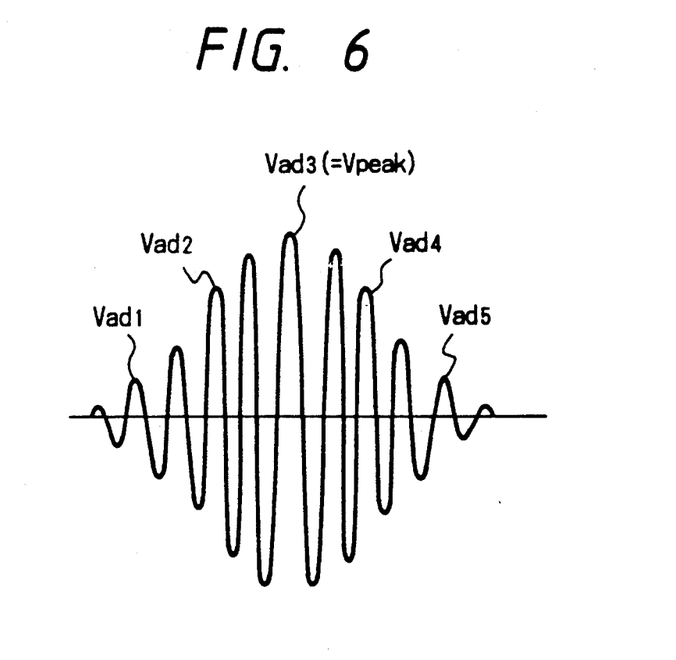
FIG. 6 shows a detected knocking signal for example.

FIG. 5 shows a timer interrupt routine. When the timer interruption starts in a step T00, an A/D input port is set in a step T10. In the following step T20, a magnitude V of knocking is detected. The magnitude V of knocking includes local maximum values Vadj (j=1, 2, 3, . . . , n) and the maximum value Vpeak of these local maximum values of the knocking signal in accordance with the detection signal from the knocking sensor 11 as shown in FIG. 6 showing the knocking signal for example. After detection of the magnitude V of knocking is obtained, in the following step T30, knocking judgment is executed in accordance with the detected magnitude V. In the step T30, for example, count CPLS is increased when:

$$Vadj \geq Vref.$$

In step T40, a first averaging processing of the detected Vadj, that is a first averaging processing is executed in accordance with the following equation:

$$Vmadj = (Vmadj-1) + \{(Vadj) - (Vmadj-1)\}/16.$$

In the following step T50, a decision is made as to whether the knocking judging interval is finished. If the knocking judging interval is not finished, processing returns to the step T20. If the knocking judging interval is finished, processing proceeds to a step T60 where a knocking judging result is outputted.

In a step T60, knocking is judged such that the magnitude of knocking is detected. For example, the number of times when the above-mentioned Vad is larger than Vref is counted and judgement is executed in accordance with the magnitude of count CPLS. For example, judging is made in accordance with the following equations:

$0 \leq CPLS \leq 1$ ... no knocking
$2 \leq CPLS \leq 3$ ... low degree of knocking
$4 \leq CPLS \leq 6$ ... medium degree of knocking
$7 \leq CPLS$ ... large degree of knocking In the following step T70, a second time of averaging processing of the knocking sensor signal Vad is executed in accordance with the following equation:

$$Vmeanj = (Vmeanj-1) + \{(Vmad) - (Vmadj-1)\}/4.$$

In a step T80, knocking state detection processing is executed. In a step T90, selection processing of the A/D ports is executed. In a step TAO, processing returns to the main routine.

Hereinbelow will be described a method of communication of the knocking judging result from the knocking detection microprocessor 21.

Figure 7:
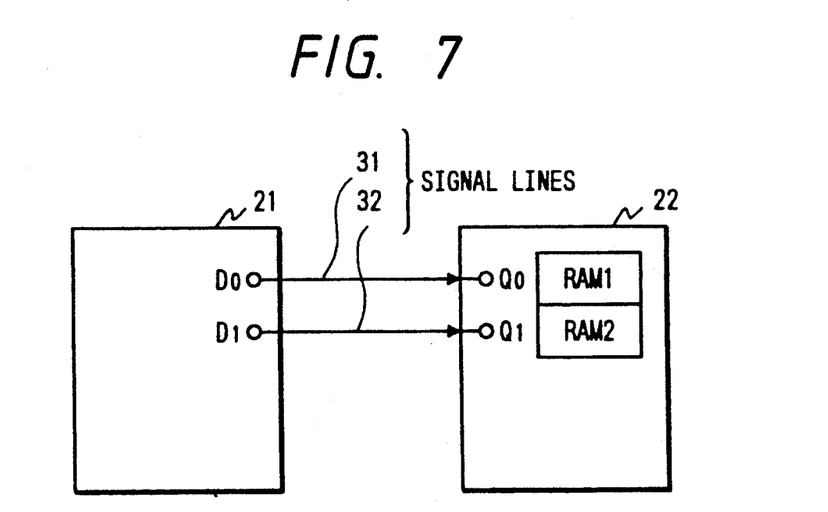
FIG. 7 is a block diagram showing connection between the knocking detection microprocessor and the engine control microprocessor shown in FIG. 1.

FIG. 7 is a block diagram showing connection between the knocking detection microprocessor 21 and the engine control microprocessor 22. These two microprocessors 21 and 22 are connected with two signal lines 31 and 32. Input ports $D_0$ and $D_1$ are connected to output ports $Q_0$ and $Q_1$ respectively.

The knocking judgement result is presented by combinations of a high level "1" and a low level "0" of the two signal lines 31 and 32. The knocking control microprocessor comprises RAM1 and RAM2 for storing output values of the ports $Q_0$ and $Q_1$.

Figure 8:
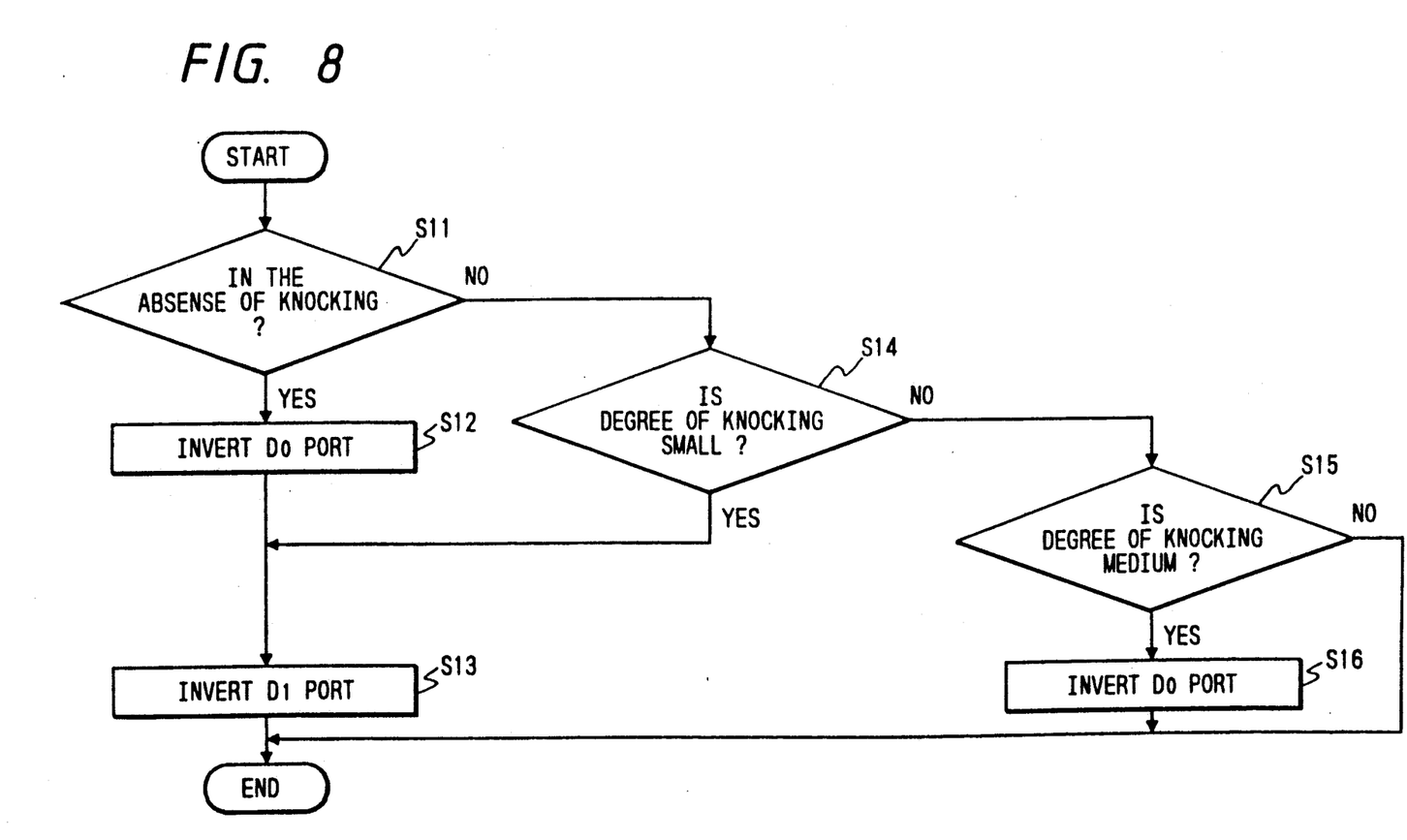
FIG. 8 shows a flow chart of a knocking detection result outputting processing of the knocking detection microprocessor.

At first, operation of the knocking judging microprocessor 21 will be described with reference to FIG. 8. FIG. 8 shows a flow chart of knocking detection result outputting processing.

Steps S11-S16 constitutes a routine for processing of outputting the knocking detection result (no knocking, a large degree of knocking, a medium degree of knocking, and a small degree of knocking) at the output ports $D_0$ and $D_1$ of the signal lines 31 and 32 and it is executed at every 10° CA ATDC (after top dead center).

In step S11, a decision is made as to whether the knocking detection result made at a step T60 of FIG. 5 shows the absence of knocking or not. In the absence of knocking, the microprocessor 21 outputs an inverted value of the value outputted at last time at port $D_0$ in step 12. For example, if the last output value is 0, "1" is outputted this time.

Then, in step S13, an inverted value of the value outputted at the last time is outputted at the port $D_1$.

In the step S11, if the knocking detection result of the step T60 of FIG. 5 is judged the presence of knocking, in a step S14, a knocking inverted result is judged whether degree of knocking is small or not. If the degree is small, an inverted value of the last value of the port $D_1$ is outputted at the port $D_1$ in the step S13.

If the knocking inverted result of the step T60 does not show the small degree, a decision is made as to whether the degree of the knocking is medium in a step S15. If the degree of the knocking is judged medium, an inverted value of the last output value of port $D_0$ is outputted at the port $D_0$ in a step S16.

If the knocking judging result is judged not the medium degree, that is, is judged large degree, the same values of the ports $D_0$ and $D_1$ as those outputted at the last time are outputted.

Combinations of output values of ports $D_0$ and $D_1$ of the knocking judging result mentioned above is as follows:

TABLE 2

| knocking judging result | no knocking | low degree of knocking | medium degree of knocking | large degree of knocking |
|---|---|---|---|---|
| port $D_0$ | inverted output | non-inverted output | inverted output | non-inverted output |
| port $D_1$ | inverted output | inverted output | non-inverted output | non-inverted output |

That is, in the absence of knocking, the output values of ports $D_0$ and $D_1$ are obtained by inverting values outputted at the last time. If the degree of knocking is small, the output value of the port $D_0$ is the same value outputted at the last time and the output value of the port $D_1$ is obtained by inverting the value outputted at the last time.

If the degree of knocking is medium, the output value of the port $D_0$ is an inverted value of the value outputted at last time and the output value of the port $D_1$ is the same value of the value outputted at the last time.

If the degree of knocking is large, the output values of the ports $D_0$ and $D_1$ are the same values of the last output value.

Figure 9:
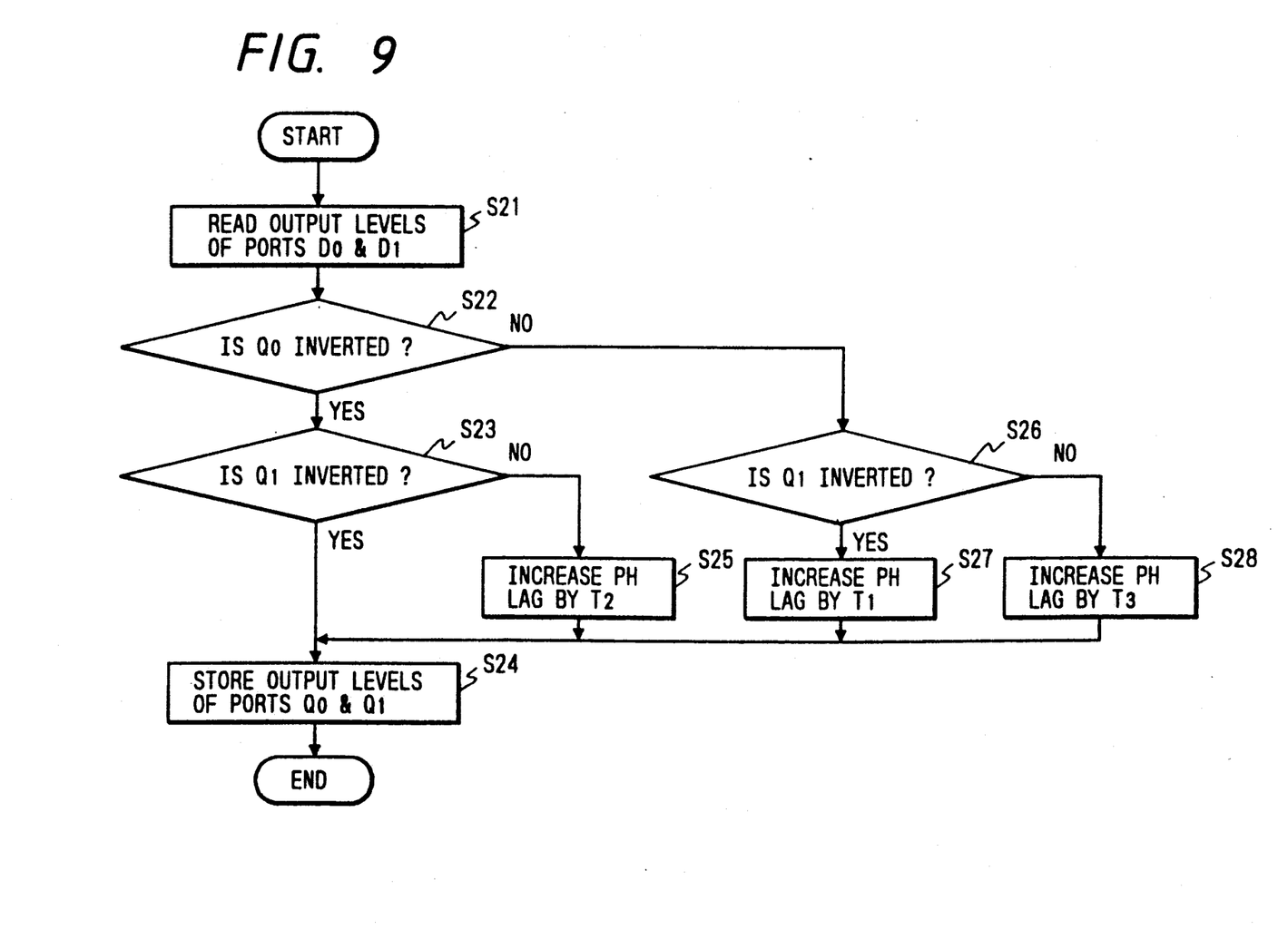
FIG. 9 shows a flow chart of restoring of information processing of a knocking control microprocessor.

Operation of the engine control microprocessor 22 will be described with reference to FIG. 9. FIG. 9 shows a flow chart of restoring of information processing of knocking control microprocessor 22.

This routine is executed at every timing of 20° CA ATDC (after top dead center).

At first, in step S21, the output values of ports $D_0$ and $D_1$ are read out through the signal lines 31 and 32 at port $Q_0$ and $Q_1$.

In step S22, a decision as to whether the output value of port $Q_0$ is inverted or not by comparing the last output values of port $Q_0$ stored in the RAM 1 with that obtained this time is carried out.

If the output value of the port $Q_0$ is inverted, in step S23, a decision as to whether the output value of port $Q_1$ is inverted or not by comparing the last output values of port $Q_1$ stored in the RAM 2 with that obtained this time is carried out.

If the output value of the port $Q_1$ is inverted, in step S24, the present output values of the ports $Q_0$ and $Q_1$ are stored in the RAM1 and RAM2 in place with the last output values.

In step S23, if the output value of the port $Q_1$ is not inverted, that is, if the output value of the port $Q_0$ is inverted but the output value of the port $Q_1$ is not inverted, the knocking judging result shows the medium degree of knocking. In this case, an amount of phase lag of knocking is increased by $T_2$ where $T_2$ is set to, for example, 1° CA in step S25.

In step S22, if the port $Q_0$ is judged non-inverted in the step S22, a decision is made in step S26 as to whether the port $Q_1$ is inverted.

If the port $Q_1$ is inverted, that is, if the port $Q_0$ is not inverted but the output value of the port $Q_1$ is inverted, the knocking judging result shows the small degree of knocking. In this case, an amount of phase lag against knocking is increased by $T_1$ where $T_1$ is set to, for example, 0.5° CA in a step S27.

In the step S26, if the port $Q_1$ is judged non-inverted, that is, if the both ports $Q_0$ and $Q_1$ are non-inverted, the knocking judging result shows the large degree of knocking. In this case, an amount of phase lag against knocking is increased by $T_3$ where $T_3$ is set to, for example, 2° CA in step S28.

After the amount of phase lag against knocking is determined in steps S25, S27, and S28, the output values of ports $Q_0$ and $Q_1$ inputted in this time are stored in step S24. Then, this routine ends.

As described above, the amount of phase lag per one detection of knocking is determined in accordance with the magnitude of knocking. That is, a relation of the amount of phase lag to the degrees of knocking, namely, large, medium, small, is as follows:

$$T_3 > T_2 > T_1.$$

In this embodiment, the amount of phase lag against knocking using the amounts of phase lag ($T_3$, $T_2$, and $T_1$) per one detection of knocking corresponding the magnitude of knocking is determined. The ignition timing is determined by phase-delaying a basic ignition timing $T_B$ determined by the engine speed, a pressure of the intake air, etc. by the amount of the phase lag of knocking at every ignition timing. Moreover, the ignition timing is determined by decreasing the phase lag by a given amount at every given interval.

According to this embodiment, reliable phase lag control is performed though only one of ports $D_0$, $D_1$, $Q_0$, and $Q_1$. That is, if either of signal lines 31 and 32 fails a knocking detection result determined by the knocking detection microprocessor 2 indicating the presence of knocking is not transmitted to the engine control microprocessor 22. Therefore, it is possible to prevent the internal combustion engine from damage.

As another embodiment, communication between the knocking detection microprocessor 21 and the knocking control microprocessor 22 can be made with one signal line.

In this case, when the knocking detection microprocessor judges the absence of knocking, an output level of the signal line detected at the last time is inverted. When the knocking detection microprocessor judges the presence of knocking, an output level of the signal line detected at the last time is not inverted.

Then, the knocking control microprocessor 22 reads the output level of the signal line 22. When the output level read out at this time is the same as that read out at last time, a given phase lag is carried out.

Moreover, when the signal lines, the ports of the knocking detection microprocessor 21, or the ports of the knocking control microprocessor is failed, the output level of the signal lines do not change and are the same values as output previously.

Therefore, in this case, a phase lag control is performed, so that the internal combustion engine is prevented from damage by knocking.

Further, in the above-mentioned embodiment, it is possible that a failure of the knock sensor 11 is detected by the knocking control microprocessor 21 and then, the phase lag control is carried out with the output levels of the ports $D_0$ and $D_1$ being unchanged.

In the above-mentioned embodiment, the communication system between a detection portion, i.e., the knocking sensor and microprocessor 21 for detecting knocking and sending information of knocking, and a control portion, i.e., microprocessor 22 for knocking control is described. However, this invention should not be limited to the above-mentioned embodiment but includes the following embodiment:

A control apparatus comprises a detection portion for detecting a running condition of a motor vehicle from an output of a sensor; and a control portion for controlling an internal combustion engine in accordance with information obtained from the output of the detection portion through a communication system therebetween wherein the information is represented by change in level of output from the last level outputted or detected to the present level. In the absence of the change, a fail-safe control is performed in consideration with failure in the communication system. Such fail-safe control is, for example, cutting off of fuel supply if this invention is applied to a misfire detection apparatus.

Moreover, in the above-mentioned embodiment, data communication is carried out using a two signal line. That is, data is communicated in parallel. However, such data can be communicated with a single line by the serial transmission method.

What is claimed is:

1. A control apparatus for an internal combustion engine comprising:
    a knocking sensor for detecting knocking in said internal combustion engine and providing signals indicative thereof;
    means for determining a magnitude of said knocking in accordance with said signals and outputting first and second magnitude signals indicative thereof, said determining means comprising means for representing said magnitude of said knocking as a first difference between a first level of said first magnitude signal at a first predetermined time and a second level of said first magnitude signal at a second predetermined time and a second difference between a third level of said second magnitude signal at a third predetermined time and a fourth level of said second magnitude signal at a fourth predetermined time; and
    means for controlling said internal combustion engine in accordance with said first and second difference, said controlling means receiving said first and second magnitude signals.

2. A control apparatus for an internal combustion engine as claimed in claim 1, wherein said control means comprises phase lag setting means for setting an amount of phase lag in ignition timing of said internal combustion engine in proportion with said magnitude of knocking.

3. A control apparatus for an internal combustion engine as claimed in claim 2, wherein said phase lag setting means sets said amount of phase lag at a maximum amount when said first difference and said second difference each are zero.

4. A control apparatus for an internal combustion engine as claimed in claim 1, wherein said controlling means comprises means for storing first and second values representing said first and third levels, respectively, when said first and second magnitude signals being received by said controlling means are at said first and third levels, respectively, said controlling means replacing said first and second values stored in said storing means with third and fourth values representing said second and fourth levels, respectively, when said first and second magnitude signals being received by said controlling means are at said second and fourth levels, respectively.

5. A control apparatus for an internal combustion engine as claimed in claim 4, further comprising means for transmitting said first and second magnitude signals from said determining means to said controlling means.

6. A control apparatus for an internal combustion engine as claimed in claim 5, wherein said controlling means determines a defect in said transmitting means in accordance with said first and second difference.

7. A control apparatus for an internal combustion engine as claimed in claim 6, at least one of said first and second difference being zero when said defect exists in said transmitting means.

8. A control apparatus for an internal combustion engine as claimed in claim 6, further comprising means for transmitting said first and second magnitude signals from said determining means to said controlling means.

9. A control apparatus for an internal combustion engine as claimed in claim 8, wherein said controlling means determines a defect in said transmitting means in accordance with said first and second difference.

10. A control apparatus for an internal combustion engine as claimed in claim 9, at least one of said first and second difference being zero when said defect exists in said transmitting means.

* * * * *